Figures 1, 1A, 2:
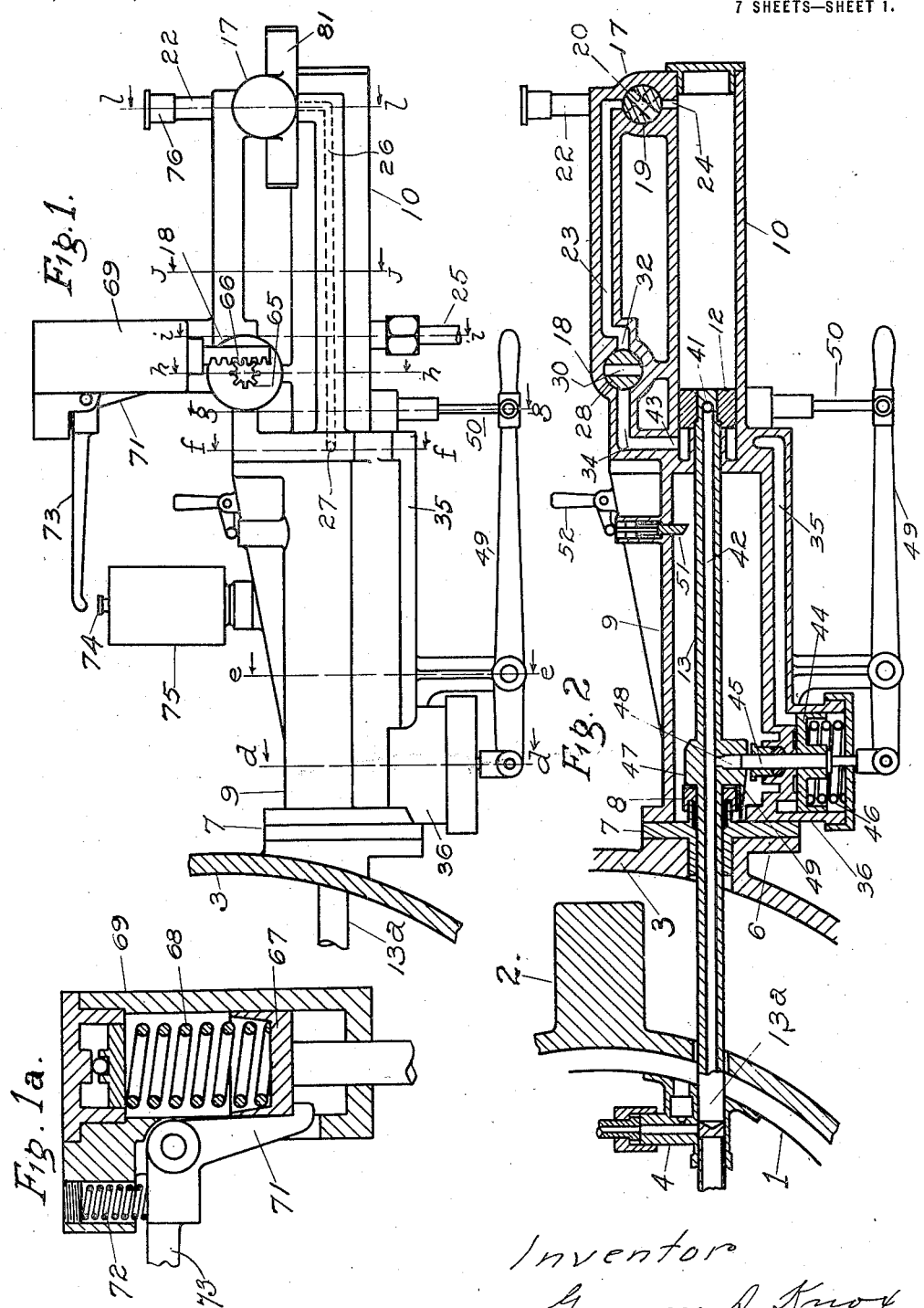

G. A. KNOX.
TORPEDO MECHANISM STARTER.
APPLICATION FILED MAY 18, 1915.

1,163,159.

Patented Dec. 7, 1915.
7 SHEETS—SHEET 1.

Inventor
George A. Knox

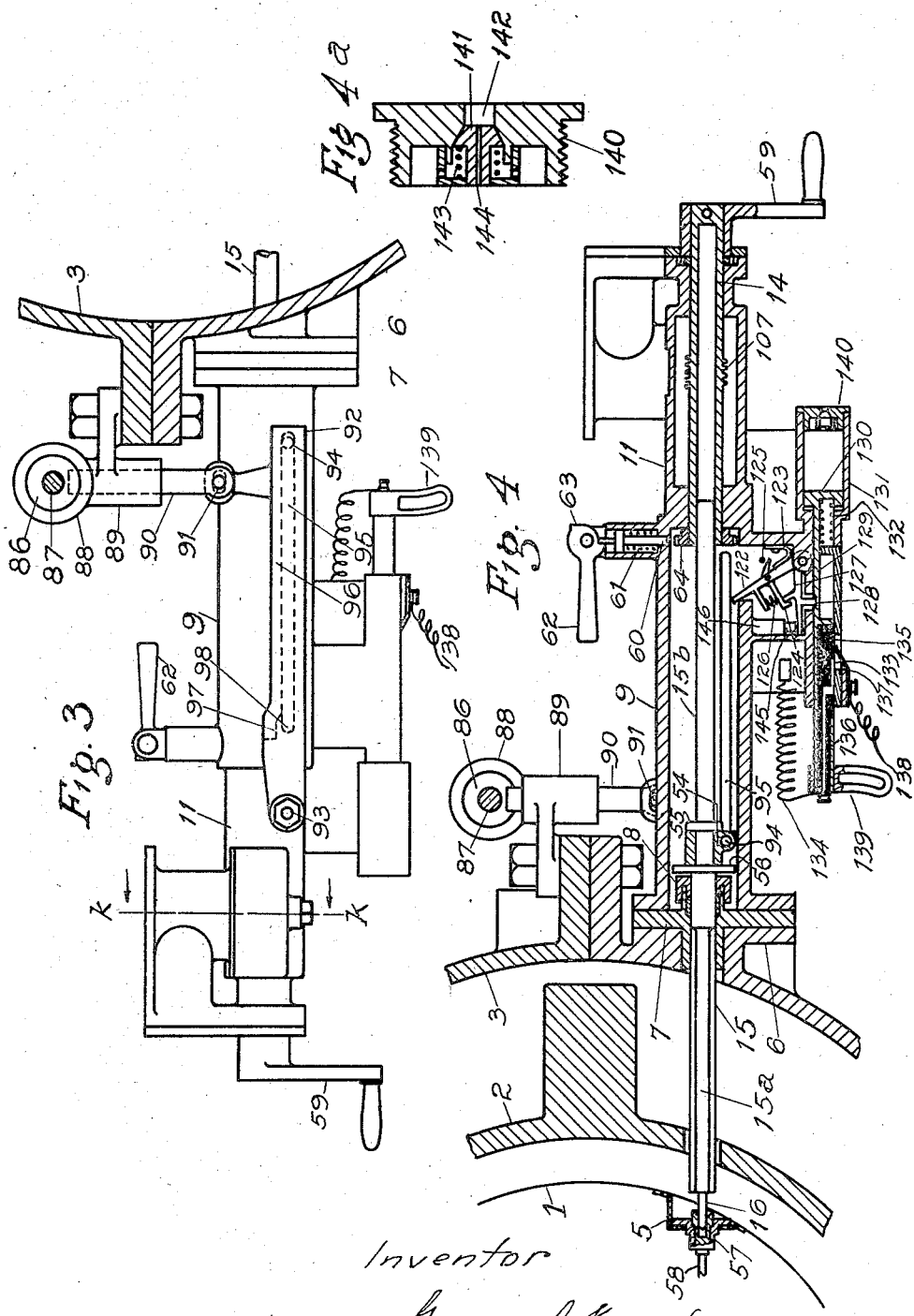

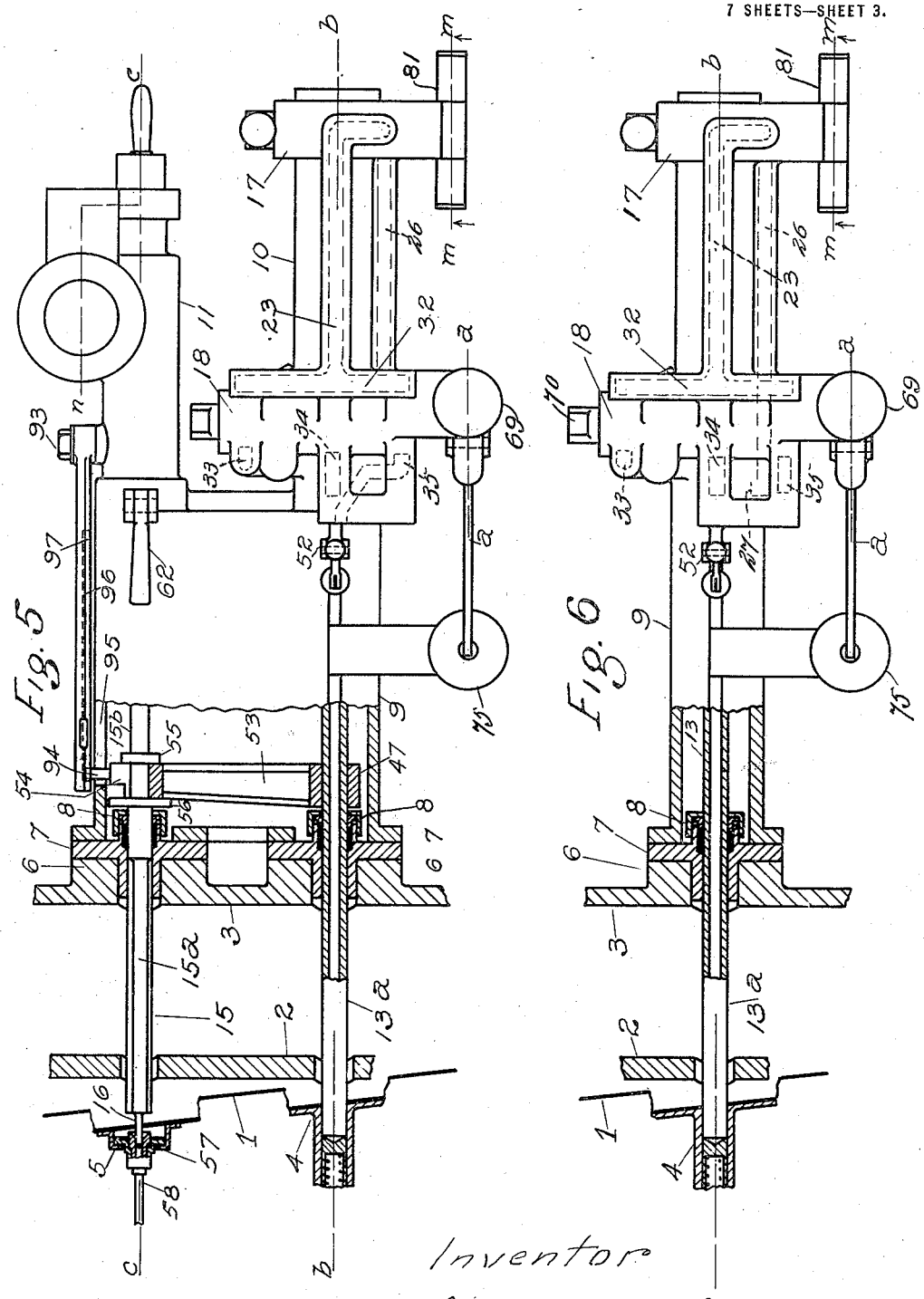

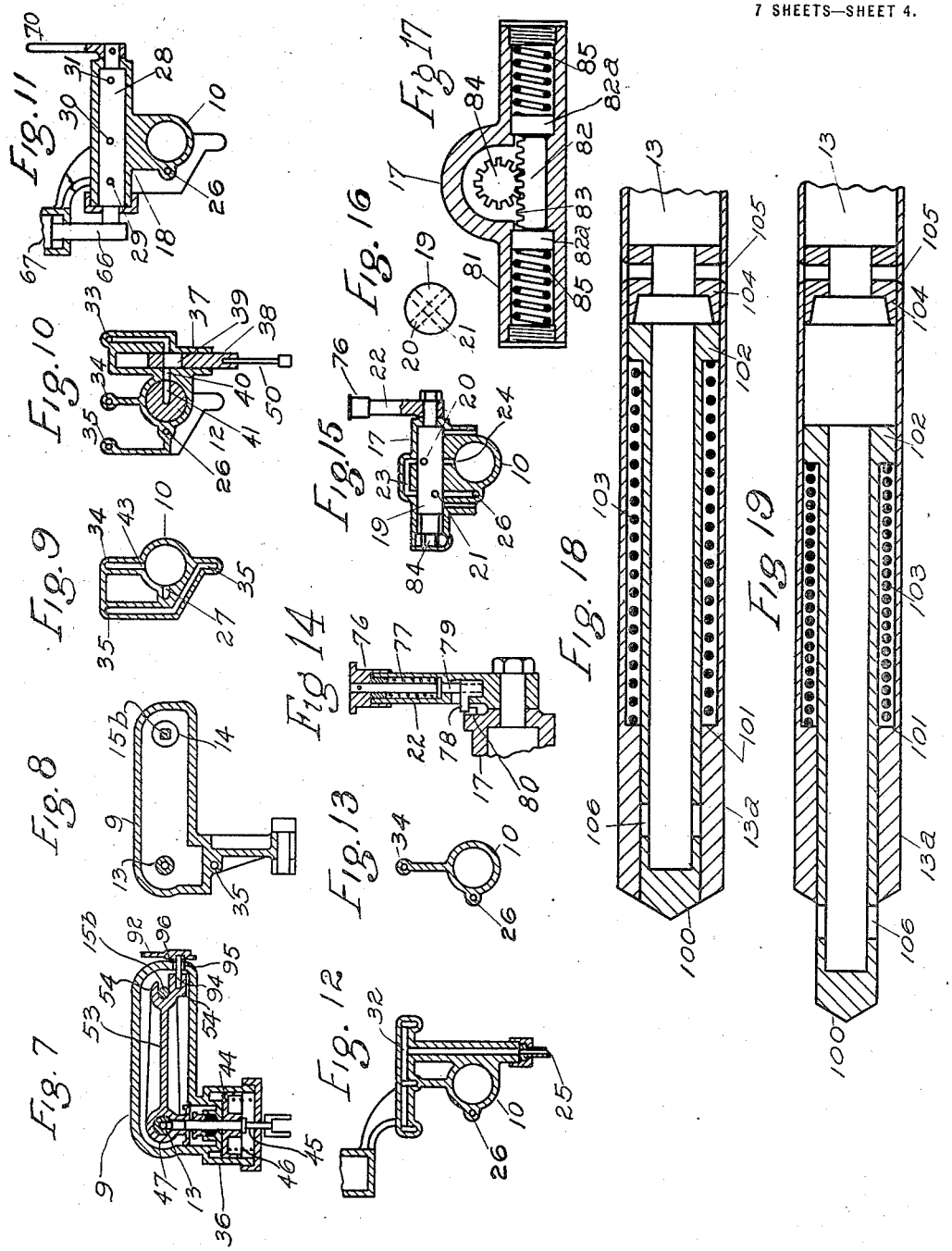

G. A. KNOX.
TORPEDO MECHANISM STARTER.
APPLICATION FILED MAY 18, 1915.
1,163,159.
Patented Dec. 7, 1915.
7 SHEETS—SHEET 5.
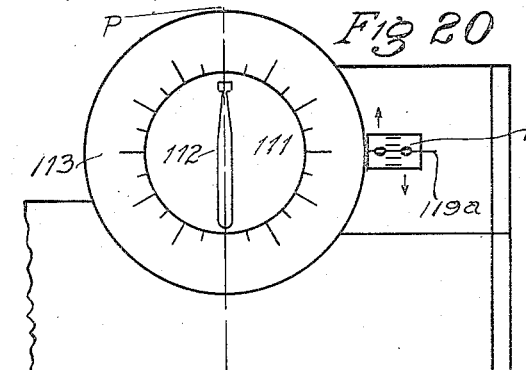
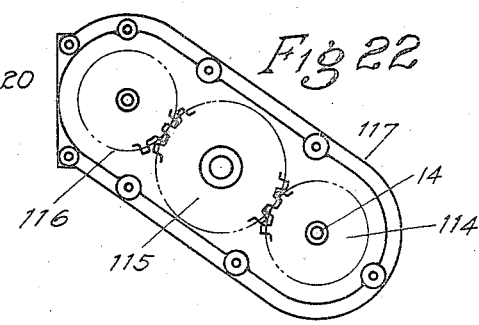
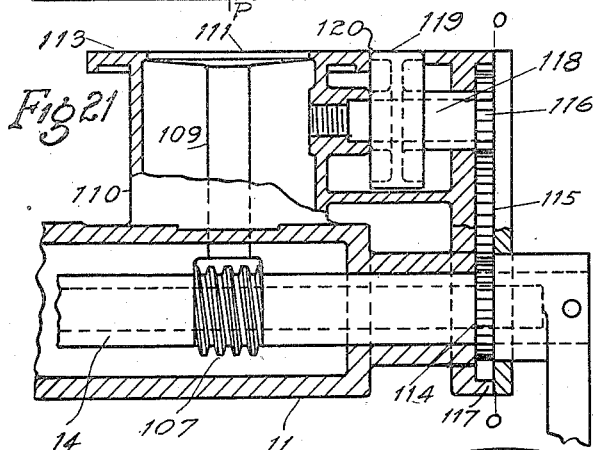
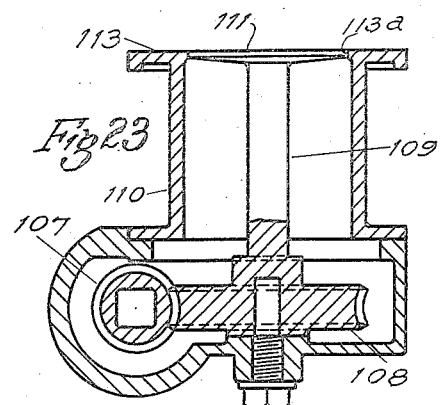
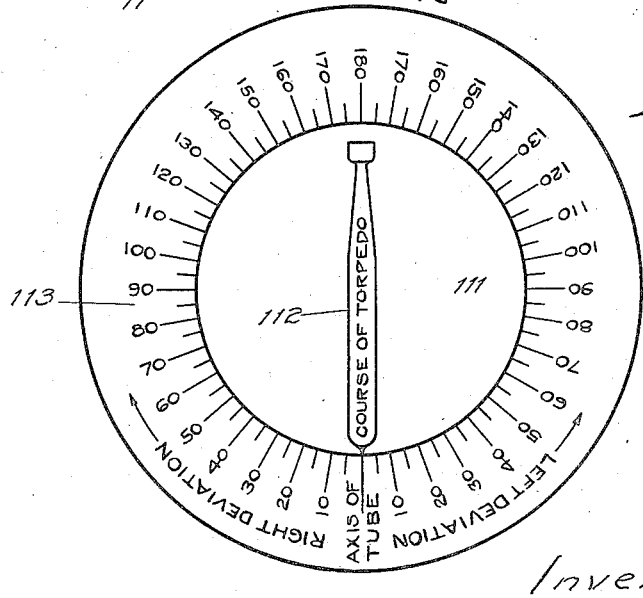
Inventor
George A. Knox

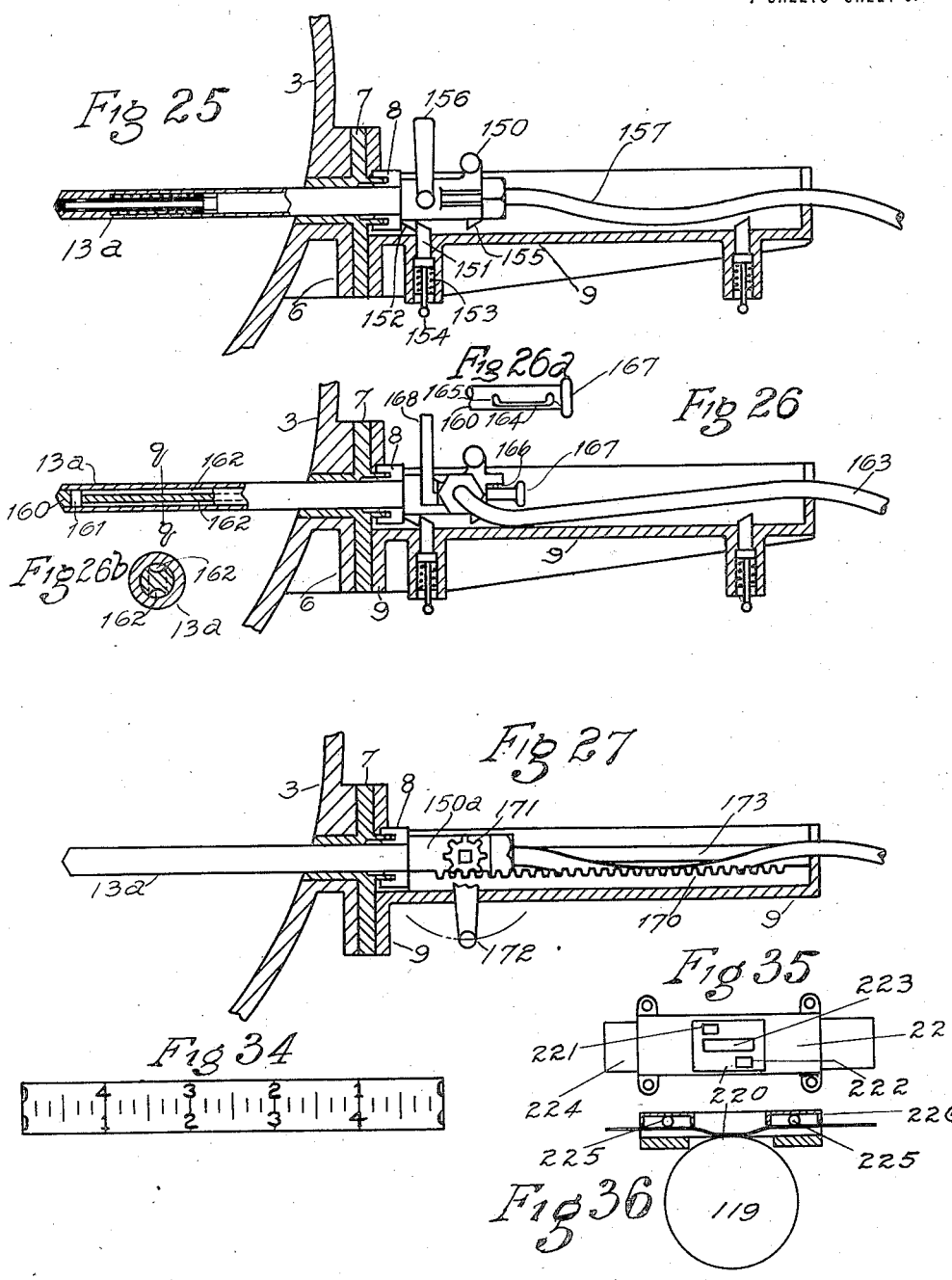

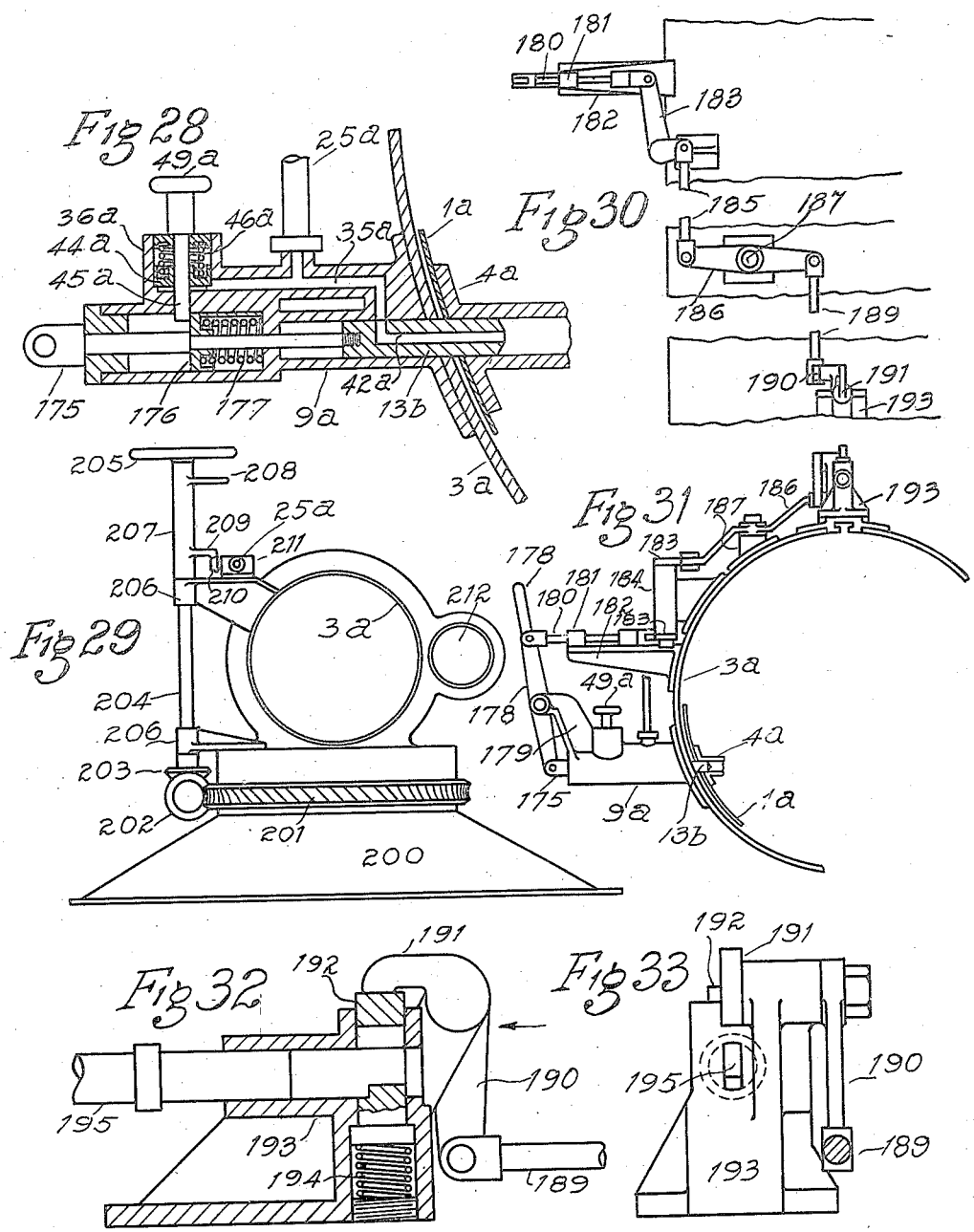

UNITED STATES PATENT OFFICE.

GEORGE ALFRED KNOX, OF WASHINGTON, DISTRICT OF COLUMBIA, ASSIGNOR TO KENNETH ALFRED KNOX, OF CAMBRIDGE, MASSACHUSETTS.

TORPEDO MECHANISM STARTER.

1,163,159.

Specification of Letters Patent.

Patented Dec. 7, 1915.

Application filed May 18, 1915. Serial No. 28,918.

*To all whom it may concern:*

Be it known that I, GEORGE ALFRED KNOX, a citizen of the United States, residing at 3920 Fifth street northwest, Washington, District of Columbia, have invented new and useful Improvements in Torpedo Mechanism Starters, of which the following is a specification.

My invention relates to improvements in mechanism for "setting" and "starting" automobile torpedoes used in offensive and defensive warfare. It is designed to be used with torpedoes equipped with my improved starting mechanism fully shown and described in my co-pending application Serial Number 927, filed January 7th, 1915.

In its broader aspect it is successfully applied to both the under water type of torpedo tube and the above water type of torpedo tube.

Torpedoes are provided with machinery for driving one or more propellers to cause the torpedo to travel through the water and they are also provided with suitable steering machinery automatically controlled by the gyro mechanism.

Before the torpedo is launched from the torpedo tube both the propeller driving mechanism and the gyro mechanism must be started and the gyro must be set to cause the torpedo to travel in the direction desired. It is for the purpose of starting said machinery and for predetermining the direction of the flight of a torpedo that I have invented the mechanism hereinafter described and claimed.

Its objects are: To provide a mechanism, attached to the torpedo tube by which the torpedo gyroscope may be set, the torpedo gyro-spinning and turbine driving machinery may be started and the tube electric firing circuit may be automatically closed to discharge the torpedo therefrom. To provide a mechanism which may be operated for practice or drill purposes, to accustom the torpedo crew to its ready use without starting the machinery in the torpedo or closing the tube firing circuit. To provide a mechanism which may be operated for drill purposes to accustom the torpedo crew in handling and "setting" the torpedo and which will permit it to be launched from the tube without starting the torpedo actuating mechanism, when so desired. To provide a suitable safety firing interlocking gear that will render impossible the premature or accidental discharge of the tube until the "gate" has been fully raised and the torpedo mechanism manipulating members completely withdrawn from the tube interior. To provide novel and improved mechanism for "setting" the torpedo gyro, which mechanism is retained inserted in the torpedo to control the direction of its flight up to the instant of firing the tube. To provide mechanism which, upon the closing of an electric circuit, automatically delivers fluid under pressure to mechanism actuating the torpedo gyro-spinning and turbine operating machinery, automatically shuts off the supply of fluid as soon as it reaches a predetermined pressure; automatically withdraws the torpedo propelling mechanism starting nozzle through which such fluid is supplied, also automatically withdrawing, simultaneously, the gyro-setting wrench shaft and locking them both in their fully withdrawn positions, in which position only is it possible to close the electric circuit to fire the tube, automatically withdrawing a safety firing interlock bolt to permit the firing rod to move longitudinally outboard, and automatically closing an electric circuit which actuates mechanism which moves the firing rod longitudinally to operate the firing valves. To provide a novel and improved form of firing circuit closer having incorporated therewith as a co-acting member a suitable retarder piston provided with an escape orifice of such size as will secure the delayed action necessary to fully energize the solenoid operating the tube firing mechanism. To provide an indicating dial which shows exactly, at all times the precise direction the gyro will cause the torpedo to take when launched.

Other objects and advantages of my invention will appear as the description proceeds.

I attain these objects by mechanism illustrated in the accompanying drawings in which:

Figure 1 is an elevation looking inboard. Fig. 1ª is a section of the latch and valve actuating mechanism taken on the line *a—a* of Figs. 5 and 6. Fig. 2 is a sectional view taken on the line *b—b* of Figs. 5 and 6. Fig. 3 is an elevation looking outboard. Fig. 4 is a sectional view taken on the line *c—c* of Fig. 5. Fig. 4ª is a detail of a retarding valve shown in Fig. 4. Fig. 5 is a plan view, partly in section, to show the connection between the starting mechanism and the gyro-setter. Fig. 6 is a plan view, partly in section, of the starting mechanism, only. Fig. 7 is a section taken on the line *d—d* of Fig. 1. Fig. 8 is a section taken on the line *e—e* of Fig. 1. Fig. 9 is a section taken on the line *f—f* of Fig. 1. Fig. 10 is a section taken on the line *g—g* of Fig. 1. Fig. 11 is a section taken on the line *h—h* of Fig. 1. Fig. 12 is a section taken on the line *i—i* of Fig. 1. Fig. 13 is a section taken on the line *j—j* of Fig. 1. Fig. 14 is a detail of the safety lock to prevent the accidental operation of the device. Fig. 15 is a section taken on the line *l—l* of Fig. 1. Fig. 16 is a diagram showing the location of ports in the rotary valve member shown in Fig. 15. Fig. 17 is a section taken on the line *m—m* of Figs. 5 and 6. Figs. 18 and 19 are sections of the torpedo penetrating end of the tubular piston rod showing two different positions of the plunger valve therein. Fig. 20 is an enlarged view of the dial mechanism illustrated in Fig. 5. Fig. 21 is a section taken on the line *n—c* of Fig. 5. Fig. 22 is a section taken on the line *o—o* of Fig. 21. Fig. 23 is a section taken on the line *p—p* of Fig. 20. Fig. 24 is a plan view of the gyro-setting dial on an enlarged scale. Fig. 25 is a view of a modification adapted to be operated by hand. Fig. 26 is a view of a modification adapted to be operated by hand, in which the spring actuated plunger valve of the preferred form is replaced by a rod having grooves along its sides. Fig. 26ª shows the grooves in the rod by which it is locked in either the projected or the withdrawn position. Fig. 26ᵇ is a cross-section taken on the line *q—q* of Fig. 26. Fig. 27 is a view showing a modification in which a rack and pinion are provided to project and retract the firing nozzle. Fig. 28 is a vertical longitudinal section of my mechanism starter applied to an above-water torpedo tube. Fig. 29 is an elevation showing the torpedo tube and the compressed air tank in section. Fig. 30 shows the system of links and levers employed to transmit motion from the starting nozzle to automatically operate the tube firing mechanism sear or lock. Fig. 31 is an elevation of the mechanism shown in Fig. 30. Fig. 32 is a section through the sear box. Fig. 33 is an elevation of the mechanism shown in Fig. 32, looking in the direction of the arrow points. Fig. 34 is a plan view of the graduated surface (developed) of drum 119, shown in Fig. 21. Fig. 35 is a plan view of a modification showing an automatic frictional shifting shutter for disclosing the graduation to be read from drum 119. Fig. 36 is a vertical transverse sectional view of the modification shown in Fig. 35.

In all the figures of the drawings and throughout the specification each element wherever indicated has its particular and specific designating symbol.

A fragment of the torpedo is designated by 1, a part of the spoon by 2, and a section of a torpedo tube by 3.

4 designates a portion of the turbine actuating and gyro-setting mechanism, which forms the subject of my co-pending application Serial Number 927, filed January 7th, 1915.

At 5 (Fig. 4) is shown some of the gyro-setting mechanism. The torpedo tube 3 has two seats or bosses 6, properly placed, in each of which is located a flanged bushing 7. Through one of the bushings 7 reciprocates the tube 15, (Fig. 4) in which is inclosed a rod 15ª, upon the free end of which is located the gyro-setting wrench 16. And through the other bushing 7 reciprocates the torpedo propelling mechanism starting-nozzle 13ª. Tube 15 and nozzle 13ª are both surrounded by water-tight packing devices 8 attached to tubular extensions on bushings 7.

Secured to bosses 6 is a casing 9 which carries the active elements of my invention. In the preferred form casing 9 has two extensions 10 and 11 (Fig. 5). Extension 10 is a cylinder in which reciprocates a piston 12 (Fig. 2) attached to the tubular piston rod 13, having at its other end the starting nozzle 13ª. Extension 11 though shown as a cylinder (Figs. 3, 4 and 5) is merely a support to rotatably carry a tube 14 (Fig. 4) in which is non rotatably telescoped the shaft 15ᵇ, to which is attached tube 15 and rod 15ª, carrying the gyro-setting wrench 16.

17 and 18 (Figs. 2, 11 and 15) are valve casings in which are the valves which control the supply of fluid under pressure to operate the machine. Valve 19 in casing 17 has two passage ways 20 and 21 (Figs. 2, 15 and 16) so located that when the valve 19 is rotated 45 degrees by pushing handle 22 (fixed to valve 19) toward the torpedo tube 3 passage way 20 is placed in communication with conduit 23 and port 24, and fluid under pressure (which is constantly supplied to conduit 23 through pipe 25 (Figs. 1 and 12) is admitted to cylinder 10, in the rear of piston 12 and drives the piston toward the torpedo tube. When valve 19 is rotated 45 degrees by swinging the handle 22 from its neutral or vertical position away from the torpedo tube, passage way 21 connects conduit 23 with conduit 26 (Fig. 15) which communicates with cylinder 10 through a port 27 (Fig. 9) admitting air to the front of piston 12 to drive the piston to the rear of cylinder 10.

Fig. 15 shows two exhaust ports leading from the inside of valve casing 17 to the outer air. The one on the right is connected with port 24 by a groove in the valve plug when conduit 21 and the port leading to conduit 26 are in registration; the one on the left is connected with the port of conduit 26 by a similar groove when ports 20 and 24 are in registration. This kind of exhaust is well known in pneumatic engines and further illustration and description are unnecessary.

Valve 28 in valve casing 18 (Figs. 2 and 11) is provided with three spaced apart parallel passages 29, 30 and 31. Normally these passages are vertical and closed but when valve 28 is rotated 90 degrees all three passages, 29, 30 and 31 are placed in communication with a common extension 32 (Fig. 12) of conduit 23 thereby establishing communication through conduits 33, 34 and 35 with the inside of tubular piston rod 13, the front of cylinder 10 and locking cylinder 36, respectively.

Conduit 33 leads through valve casing 37 (Fig. 10) in which reciprocates a valve plug 38, having a passage 39, in communication with a port 40 leading into cylinder 10 at a point which (when piston 12 is at the limit of its forward movement) registers with a port 41 (Figs. 2 and 10) in the piston 12 in communication with the interior 42 of tubular piston rod 13. Conduit 34 leads through port 43 (Figs. 2 and 9) into the front of cylinder 10, supplying fluid under pressure for the purpose of returning piston 12 to the rear end of cylinder 10 as soon as it is unlocked and free to move. Conduit 35 (Figs. 2, 9 and 10) leads to locking cylinder 36 (Figs. 2 and 7) is provided with an air tight piston 44, carrying a locking pin 45. A spring 46 is interposed between the cylinder head and piston 44. Normally spring 46 keeps piston 44 with its locking pin 45 at the limit of its upward movement. Suitably located upon tubular piston rod 13 is a collar 47 having a locking recess 48 and a forward projecting wedge 49. When tubular piston rod 13 is driven forwardly, wedge 49 rides upon and depresses locking pin 45 until locking recess 48 registers with locking pin 45, whereupon spring 46 projects locking pin 45 into locking recess 48, and holds starting plunger 13 at the limit of its forward movement until piston 44 is depressed sufficiently to withdraw locking pin 45 from locking recess 48.

Piston 44 is depressed in two ways, either manually by means of lever 49 or by fluid pressure supplied through conduit 35. Lever 49 is connected by link 50 with valve plug 38 (Fig. 10) in valve casing 37 and therefore when piston 44 is depressed the opposite end of lever 49 rises, and port 40 is closed by valve 38 thereby cutting off the supply of fluid to the interior of tubular piston rod 13.

Upon the release of tubular piston rod 13 by the withdrawal of locking pin 45 from locking recess 48, the fluid in conduit 34 flowing into cylinder 10, through port 43, in the front of piston 12 drives the piston to the rear end of the cylinder 10 where it is locked by spring pressed latch 51 passing through an opening in casing 9 and so located that it will snap to locking position in front of collar 47 when the collar is at the rear limit of its travel. An elbow lever 52 is connected with latch 51 to provide a means to withdraw the latch manually.

Collar 47 has an arm or lateral extension 53 (Figs. 5 and 7) which is bifurcated at its free end, and the legs 54 of the bifurcation straddle a cylindrical portion of shaft $15^b$, between two collars 55 and 56; therefore, as connected, tubular piston rod 13 and telescoping shaft $15^b$ travel in unison.

There are two perforations in the spoon, and two in the torpedo which register with the openings through bushings 7 located in bosses 6 on the torpedo tube (Fig. 5); and when tubular piston rod 13 and shaft $15^a$ are projected they pass through the openings in the spoon and in the torpedo shell and engage the mechanisms inside the torpedo upon which they are intended to operate. The wrench 16, on the end of shaft $15^a$ engages a socket 57 on the end of gyro-setting shaft 58. Rotation of shaft $15^a$ rotates shaft 58 and thus sets the gyro. The gyro mechanism inside the torpedo is old and well known. It is not a part of my invention.

Shaft $15^b$ is non circular in cross section, and is non rotatably telescoped (Fig. 4) with carrying tube 14 mounted in bearings in extension 11 and provided with a crank 59 by which it may be rotated as much as desired in either direction and locked at any point of rotation by latch 60. A spring 61 normally holds latch 60 elevated, as shown, but when lever 62 is swung from the horizontal position to a vertical position the eccentric cam 63 depresses latch 60 until it engages with a notch in toothed wheel 64 on tube 14.

Upon one end of valve 28 there is a pinion 65 (Fig. 1) engaged by a rack 66 carried by a plunger 67 (Fig. 1ª) operated by a spring 68 in casing or cylinder 69 properly positioned and located upon extension 10. Upon the other end of valve 28 there is an arm 70 (Fig. 11) by which the valve may be turned and by the engagement of pinion 65 with rack 66 the plunger 67 is elevated and spring 68 compressed. When arm 70 is swung 90 degrees, trigger 71 operated by spring 72 snaps under plunger 67 and holds it in its elevated position with the ports of valve 28 out of registration with their respective conduits, (Fig. 2). Trigger 71 has an arm 73 projecting laterally. The end of arm 73 is positioned close to the core 74 of a solenoid 75 suitably connected with a source of electric power having a switch in the circuit. When the switch is closed electricity energizes the solenoid 75, core 74 is projected against arm 73 with sufficient force to withdraw trigger 71 freeing plunger 67 which is driven downwardly, by spring 68 carrying with it rack 66 which by reason of its engagement with pinion 65 rotates valve 28, 90 degrees, thus establishing communication between conduits 33, 34, 35 and conduits 23, as hereinbefore explained.

Lever 22 has a cap 76 (Figs. 14 and 15) which is normally held down by a spring 77 and when it is locked in the vertical position by a toe 78 connected with cap 76 by a rod 79. Toe 78 is so located that its end normally rests in a locking notch 80, properly located on valve casing 17 as shown. Lever 22 is automatically returned to the vertical position and locked. In casing 81 (Figs. 1, 5, 6 and 17) there is a reciprocating plunger 82 having a rack 83 in engagement with a pinion 84 on the end of valve 19 (Fig. 15). Compression springs 85 are interposed between the ends of plunger contact plugs 82ª and the heads of the casing 81. When lever 22 is swung either way, valve 19 and its pinion 84 are rotated, plunger 82 is reciprocated and one of the springs 85 is compressed by one of the plugs 82ª. When lever 22 is released the compressed spring expands and returns lever 22 to the vertical position where it is locked as explained.

86 is a collar (Fig. 3) fixed to the "firing rod" 87 of the torpedo tube. As usually constructed the torpedo cannot be fired until firing rod 87 is permitted to make a reciprocation as is well known to those skilled in the art.

88 is a bearing through which collar 86 reciprocates, 90 is a safety pin working in a tubular guide 89 and so positioned that one end is projected in front of the collar 86 thereby preventing its reciprocation and the firing of the torpedo until tubular piston rod 13 and the gyro-setting shaft 15ª are fully withdrawn, because pin 94 on lower leg 54 projects through a slot 95 (Figs. 3 and 4 and 7) in casing 9 and engages a rib 96 (Figs. 3 and 7) on a shutter 92 pivoted at 93. As long as shutter 92 remains horizontal safety bolt 90 prevents the movement of firing rod 87, but when pin 94 is carried back to the end 98 of slot 95 the shutter drops because the upward bend of the rib as indicated at 97 just above end 98 of the slot 95 permits shutter 92 to swing upon its pivot 93 and as it is connected at 91 to safety bolt 90, the bolt 90 is pulled downward by the fall of shutter 92.

In Figs. 18 and 19, I show the nozzle end 13ª of the tubular piston rod 13. Within the nozzle 13ª is a slidably arranged tubular plunger valve 100, closed at its outer end. There is a shoulder 101, on the inside of nozzle 13ª and a collar 102 around the inner end of plunger valve 100. An extension spring 103 is positioned between the shoulder 101 and the collar 102, normally keeping plunger valve 100 fully telescoped within nozzle 13ª. The inward movement of plunger valve 100 is limited by a suitable abutment or stop 104, held in place by rivets, 105 or otherwise. A port 106 in plunger valve 100 is uncovered when the plunger valve is projected forwardly out of nozzle 13ª as shown in Fig. 19.

When valve 28 is rotated and communication is established between conduit 23 and the inside of tubular piston rod 13, sliding valve plug 100 is projected to the position shown in Fig. 19, thus uncovering port 106. This can happen only when nozzle 13ª is seated in the starting mechanism inside the torpedo, because at that time only are the ports 40 and 41 in communication. Fluid under pressure rushes out of port 106 and operates the starting mechanism but when the pressure reaches a predetermined amount the nozzle 13ª is automatically withdrawn as hereinbefore explained and spring 103 simultaneously returns sliding plunger valve 100 to normal position as shown in Fig. 18, the compressed air in the tubular piston rod 13 escaping through opening 48 into casing 9, having an opening to the atmosphere.

The deviation of the torpedo, in its passage through the water, to the right or to the left of the line of the direction it is delivered when discharged from the torpedo tube, is controlled by mechanism inside of the torpedo called the gyro. It is absolutely necessary to successful torpedo warfare that this deviation shall be positively known before the torpedo is discharged. My invention provides mechanism by which the set of the gyro and therefore the flight of the torpedo is indicated exactly. Fixed on shaft 14 is a worm 107 (Figs. 4, 21 and 23) in engagement with a worm wheel 108 fixed to a vertical shaft 109, suitably mounted for rotation in a casing 110, forming part of extension 11. The upper end of shaft 109 as here shown, carries a disk 111, free to turn in bearing 113ª on the upper end of extension 110. A pointer 112 is provided on the upper surface of the disk, which, in conjunction with graduations around circle 113 on the upper end of the extension 110, indicates the degree of deflection for which the gyro has been set. Circle 113 is divided into 360 degrees by five degree intervals. In order that the angle of deviation may be determined to the fraction of a degree I provide an additional dial mechanism (Figs. 20, 21, 22 and 34). Gear wheel 114 is fixed to shaft 14 and meshes with gear 115, which in turn drives gear 116. This train of gears is mounted in an extension 117 of element 11. Gears 114 and 116 have exactly the same number of teeth and therefore rotate synchronously. Gear 116 is fixed to one end of a sleeve 118 carrying, at its other end, a dial wheel 119, the face of which has two series of 5 equally spaced intervals numbered to the right and to the left from 0 to 5 with intermediate graduations for every 10 minutes. See Fig. 34. The position of dial wheel 119 with reference to its pointer 119$^a$ can be read through sight opening 120 as shown in Fig. 20. The construction is such that one full rotation of shaft 14 will cause pointer 112 to move one interval or five degrees and disk wheel 119 to make one full rotation. It is obvious that any fraction of a rotation in either direction will be indicated by the part of the dial wheel 119 which shows through sight hole 120.

The markings upon the periphery of dial wheel 119 are shown in Fig. 34 which illustrates the development of the face of the dial wheel.

Figs. 35 and 36 illustrate a modification in which a shutter 220 is frictionally driven to the right or to the left by dial wheel 119. Shutter 220 has two windows 221, 222 so located as to expose the two rows of figures on the dial wheel. When the dial wheel is turned to the right window 222 passes out of sight under cover plate 226 and window 221 is brought into view through which the proper numerals designating the degrees of rotation toward the right can be read, the fractions of the degrees being shown through the central long window 223. When dial wheel 119 is rotated toward the left window 221 disappears and window 222 comes into view and exposes the figures showing the number of degrees toward the left the wheel has been rotated, the fractions being read, as before, through the long central window 223.

Windows 221, 222, and 223 are located in a spring strip 224 bearing against antifriction rollers 225. A suitable stop is arranged to check the travel of spring strip 224 at the desired positions at the right and at the left. This may be a pin projecting through a long slot in strip 224; the strip may have shoulders at each end to contact with cover plate 226 or any other suitable construction.

Provision is made for automatically completing an electric circuit which energizes a solenoid controlling the tube firing mechanism. Referring to Figs. 4 and 4$^a$, a pivoted trigger 122 is normally held in the position illustrated by a spring 123. Trigger 122 is pierced by a slot about mid-length, in which is pivotally mounted a hook 124 having its rear end located to contact with a pin 125 (when trigger 122 is swung from the torpedo), and so shaped that engagement with pin 125 will cause hook 124 to turn on its pivot against the force of a spring 126 which bears with one end upon hook 124 and with its other end against an abutment suitably placed. Hook 124 normally engages a locking element 127 suitably pivoted and provided with extension located to enter into a locking recess 128 in a piston rod 129 attached to a piston 130 in a cylinder 131 and piston 130 is normally held at the end of cylinder 131 most remote from the torpedo by expansion spring 132 suitably located between piston 130 and an abutment. Piston rod 129 is long enough to carry an elongated terminal element 133 connected with the wiring 134 and interposed between two insulating elements 135 and 136. Terminal 133 is so located that when piston 130 and its piston rod 129 are moved away from the torpedo by the expansion spring 132 it is wiped by a circuit closer 137 connected with the opposite pole of a source of electricity by a wire 138. All these elements are carried by brackets suitably placed on frame 9 and so located that the boss on lower fork 54 which carries pin 94 will contact with and carry rearwardly trigger 122 as the gyro-setting wrench is fully retracted. Piston rod 129 is provided with a handle 139. Cylinder 131 has a head 140 provided with a valve 141 (Fig. 4$^a$) to close a larger opening 142 through the cylinder head 140. Valve 141 is held seated by a spring 143. A small perforation 144 through valve 141 establishes communication at all times between the inside of the cylinder 131 and the outer air. This mechanism may be properly called the cocking mechanism.

When piston 130 is in its rear-most position handle 139 is grasped and drawn to the position shown in the drawing, spring 132 is thus compressed and opening 128 is placed in registration with locking element 127 which is immediately projected into it by a plunger 145 projected by a spring located in a casing 146. This prepares or cocks the device for firing. When piston 130 is pulled toward the torpedo a partial vacuum is created in cylinder 131, the pressure outside of cylinder 131 unseats valve 141 and air rushes through the large valve opening. Upon the retraction of shaft 15$^b$ fork 54 carries trigger 122 to a vertical position which draws locking element 127 out of opening 128 before pin 125 contacts with the tail of hook 124 and releases the hook from locking element 127. As soon as locking element 127 is lifted out of opening 128 spring 132 starts piston 130 away from the torpedo but its rate of travel is slow because the air contained in the cylinder 131 and opposing the movement of piston 130 can escape only through the small orifice 144, consequently it takes a considerable length of time for piston rod 129 to travel far enough to carry terminal 133 by circuit closing wiper 137 thus keeping the circuit closed long enough to properly energize the solenoid interposed therein.

In Fig. 25 I have shown the simplest form of my device. The element 13$^a$ and its telescoping valve plug are the same as in Figs. 2, 18 and 19. However these elements are inserted through the tube, spoon and into the torpedo manually by an operator who grasps handle 150 provided for that purpose. When the device is fully inserted into the torpedo it is locked in that position by latch 151 which engages lug 152 being forced to locking position by spring 153, as shown. The lock is released manually by pulling the knob 154 downwardly. The device is also locked in its fully withdrawn position by a latch of the same construction which engages lug 155. The nozzle having been inserted and locked in an operative position, as described, the valve handle 156 is turned which permits fluid under pressure to flow through conduit 157, enter the torpedo and operate the mechanism in the manner related in describing Figs. 2, 18, and 19.

In Figs. 26, 26$^a$, and 26$^b$ I illustrate a further modification. A manually slidable rod is substituted in nozzle 13$^a$ for the spring operated sliding plunger valve of the preferred construction. Rod 160 has a passage 161 through it near its forward end; on diametrically opposite sides grooves 162 extend from the respective ends of passage 161 rearwardly a sufficient distance to serve as connections between conduit 163 and passage 161. A groove 164 having angular extensions 165 at the ends (Fig. 26$^a$) is provided in the rear end of rod 160 in which a pin 166 plays. After the operator inserts the nozzle into the torpedo he grasps handle 167 and turns it to the right until pin 166 has left the forward right angular extension 165 of groove 164 and is in alinement with the longitudinally extending part of groove 164. In this position the rod may be freely moved forwardly until passage 161 is outside nozzle 13$^a$. A slight rotation of the rod to the left will lock it in this position because pin 166 will enter the rear right angular extension 165. Manipulation of valve handle 168 will then admit the operating fluid through conduit 163, grooves 162 and passage 161 to the torpedo.

In Fig. 27 a simple device for mechanically inserting and withdrawing the nozzle is shown. This may be added to the construction shown in Figs. 25 and 26 if desired. It consists of a rack 170 fixed to frame 9, engaged by a pinion 171 located on the valve carrying end of nozzle 13$^a$, and operated in a well known manner by a crank arm 172. One or more grooves 173 may be provided in frame 9 to be traversed by lugs projecting from nozzle carrier 150$^a$ to prevent any other than a right line movement.

In Figs. 28, 29, 30, 31, 32 and 33 I have shown a modification whereby my invention is adapted for use on an above-water torpedo-tube. Tubes of this type are usually rotatably mounted on a base 200 on the deck of a vessel.

The tube 3$^a$ is rotated in a horizontal plane by a hand-wheel 205 fixed to a shaft 204, mounted in bearings 206 and carrying at its lower end a bevel gear 203 meshing with another bevel gear (not shown) fixed to a worm 202 engaging a worm-wheel 201, encircling the base 200. By turning hand-wheel 205 in the direction desired the torpedo-tube may be trained in any direction. For this reason a gyro setter is unnecessary in this modification.

A sleeve 207 having a handle 208 and a sector shaped rack 209, is rotatably mounted upon shaft 204. Rack 209 meshes with a pinion 210 fixed to the stem of a valve located in valve box 211, interposed in any suitable manner in the conduit 25$^a$ between a compressed air tank or flask 212, (conveniently located upon the torpedo-tube) and the torpedo mechanism starter.

Before the torpedo-tube is sighted, nozzle 13$^b$ is inserted into the torpedo by operating lever 178 which is connected with rod 175 fixed to the rear end of nozzle 13$^b$ and carrying a collar 176 between which and an abutment an expansion spring 177 surrounds the rod 175 as illustrated.

When nozzle 13$^b$ is fully inserted a locking pin 45$^a$, having fixed thereto a piston 44$^a$ fitting fluid tight in cylinder 36$^a$, is projected behind collar 176 by expansion spring 46$^a$, holding nozzle 13$^b$ in its operative position with spring 177 compressed.

In this modification, a mechanical device, automatically operated, is substituted for the electric firing apparatus of the preferred form.

A catch or sear 192 in a sear box 193, suitably located on the torpedo-tube, is held by spring 194 in such a position as to prevent the endwise movement of firing rod 195, as shown in Fig. 32. Sear 192 is depressed by a finger 191 sufficiently to permit the longitudinal movement of the firing rod 195.

A link 180, sliding in bearings 181, on a bracket 182 connects lever 178 with a bell crank lever 183, mounted in a bearing 184 and the opposite arm of bell crank lever 183 is connected to a lever 186 (centrally fulcrumed at 187) by a link 185. 189 is a link connecting the opposite end of lever 186 with arm 190 of a bell crank lever, the other arm of which forms finger 191 and is so placed that the inward movement of the free end of lever 178 communicates motion through the links and levers described and swings the free end of finger 191 downwardly thereby depressing sear 192 and freeing firing rod 195 and permitting its longitudinal movement.

When the operator shall have trained the torpedo-tube in the direction desired by the rotation of hand-wheel 205, a movement of handle 208 establishes communication between flask 212, valve-box 211 and pipe 25$^a$ into conduit 35$^a$. Conduit 35$^a$ communicates through conduit 42$^a$ with the inside of the torpedo thereby starting the propeller and gyro mechanisms. When the pressure in conduit 35$^a$ shall have become sufficiently intense on piston 44$^a$ to overcome the force of spring 46$^a$, locking pin 45$^a$ is withdrawn from behind piston 176, spring 177 expands, nozzle 13$^b$ is withdrawn, lever 178 is swung upon its pivot, thereby, through the intermediate links and levers described depressing sear 192, freeing firing pin 195 which then moves longitudinally and actuates the mechanism which discharges the torpedo from its tube.

The knob 49$^a$ shown in Figs. 28 and 31 takes the place of lever 49 in the preferred form and enables operators to go through practice drills without starting the torpedo.

To recapitulate, the operation of the preferred form is as follows: The torpedo having been placed in the tube and the necessary steps taken to prepare it for the discharge of the torpedo the switch in the electric circuit which energizes solenoid 75 being open the operator grasps handle 139 (Fig. 4) and cocks the firing mechanism; he then swings handle 70 ninety degrees forwardly which elevates piston 67 (Fig. 1$^a$) and permits trigger 71 to catch and hold the piston elevated; lever 22 is then unlocked and swung forwardly 45 degrees and held there until catch 51 is withdrawn from in front of collar 47; the fluid which was admitted behind piston 12 when handle 22 was swung, drives the piston to the inner end of its cylinder where it is locked by pin 45 with nozzle 13$^a$ fully inserted in the torpedo. The forward motion of piston 12 likewise carries forward gyro setting wrench 16 until it is seated in the socket in the setting shaft. Handle 59 is then turned until the torpedo deflection as shown by the dial is as desired where it is locked by bolt 60, and then the switch, in the electric circuit of which solenoid 75 is a part, is closed. This establishes communication between the source of fluid under pressure and the front of piston 12, the inside of the torpedo and the locking cylinder 36, as has been explained. When locking pin 45 has been withdrawn piston 12 is positively returned to its rearmost position carrying with it the gyro-setting wrench. Just before the gyro-setting wrench is fully withdrawn lug 54, which carries pin 94, contacts with trigger 122 and withdraws locking element 127 from opening 128, leaving retarder piston 130 free to the action of spring 132 which starts the piston toward the rear end of its cylinder. Simultaneously with the release of the firing circuit closer pin 94 reaches the rear end of slot 95 and permits shutter 96 to drop and release firing bolt 86 ready to be actuated as soon as wiping connection 133 has been in contact sufficiently long to energize the solenoid (not shown) in the firing circuit and which releases the mechanism which operates when the torpedo is discharged from its tube.

The provision of a simple switch in the firing circuit will enable the torpedo crew to perform every operation except the actual discharge of the torpedo. This permits the drilling of the crew until every detail of the operation is familiar.

I have provided safety guards and locks so that it will be impossible to discharge a torpedo accidentally. I consider such safeguards highly desirable but they are not essential parts of my invention.

Thus it will be seen, from the foregoing description, I have devised mechanism which, taken with the mechanism disclosed in my co-pending application Serial Number 927, Jan. 7, 1915, removes all uncertainty in the operation of discharging a torpedo. This is something which has never been accomplished before my invention.

Having thus fully described my invention, what I claim to be new, and desire to secure by Letters Patent of the United States is—

1. In a torpedo machinery starter the combination of means for setting the gyro-steering-device, means for starting the propelling mechanism and the gyro-impulse-mechanism and means for inserting both the setting and the starting means into and withdrawing them from the torpedo.

2. In combination with a torpedo-tube having openings therein, a frame on said tube, a gyro setting device and a torpedo propelling mechanism starter and gyro impulse starter carried by said frame and positioned in said openings, and mechanism for projecting them through the openings in the torpedo tube.

3. In a torpedo mechanism starter, the combination of a torpedo-tube having an opening therethrough, a frame attached to said torpedo-tube, a plunger carried by said frame and positioned in said opening, mechanism for reciprocating said plunger and projecting it through the torpedo-tube and into the contained torpedo, and means for supplying fluid under pressure to said plunger whereby the torpedo machinery is started.

4. The combination of a torpedo tube having openings therethrough, of a frame attached to the torpedo tube, a tubular torpedo propelling and gyro-machinery-starter and a gyro-setting mechanism carried by the frame, a connection between the machinery starter and the gyro-setting mechanism, means for reciprocating said connected elements whereby both are simultaneously projected through said openings in the torpedo tube and its contained torpedo, means for rotating the gyro-setting mechanism and means for supplying fluid under pressure to the said tubular-machinery-starter whereby the torpedo machinery is set in operation.

5. In a torpedo mechanism starter, the combination of a conduit connected with a source of fluid under pressure, means for projecting said conduit through alined openings in the torpedo tube, the torpedo spoon and the torpedo therein and a valve in the conduit to control the flow of fluid though said conduit.

6. In a torpedo mechanism starter the combination of a tubular rod, mechanism to insert said rod through alining openings in the torpedo tube, the torpedo spoon and the torpedo therein and for withdrawing said rod therefrom, mechanism for locking said rod in its fully inserted operative position and mechanism for locking said rod in its fully withdrawn inoperative position.

7. In a torpedo mechanism starter, the combination of means to be inserted through alining openings in the torpedo-tube, torpedo spoon and the torpedo therein to set the gyro and to start the gyro impulse and the torpedo propelling machinery, mechanism for projecting said means through the torpedo-tube, torpedo spoon and torpedo therein and for withdrawing said means therefrom and a device for preventing the discharge of the torpedo from its tube until said means is fully withdrawn to its inoperative position.

8. In a torpedo mechanism starter, the combination of a stop to prevent the longitudinal movement of the torpedo firing rod, mechanism to remove said stop and release the firing rod, and mechanism to simultaneously close an electric circuit to move the rod and discharge the torpedo.

9. In a torpedo mechanism starter, a fluid operated piston, a tubular piston rod fixed thereto, means for operating the piston in both directions, means for supplying fluid under pressure to the tubular piston rod, a valved nozzle on the end of said tubular piston rod in combination with and connected for simultaneous reciprocating movement to a gyro-setting-shaft, a wrench on the end of said shaft to engage and operate the torpedo-gyro-setting shaft, mechanism connected with said shaft to indicate the direction of flight for which the torpedo is set and mechanism for rotating the gyro-setting-shaft in either direction.

10. In a torpedo mechanism starter the combination of a cylinder, a fluid operated piston therein having a tubular piston rod, ports in the ends of the cylinder connected with a supply of fluid under pressure, a valve so situated as to control the flow of fluid to both said ports and to prevent the flow of fluid to said ports, a stop to hold the tubular piston-rod in its forward position, a second valve situated in a conduit leading from a source of fluid under pressure and having three ports adapted to be simultaneously connected with said fluid supply, the first port opening into the cylinder in front of the piston, the second port opening into the tubular piston-rod and the third port supplying fluid to withdraw said stop and release the tubular piston-rod and permit the fluid delivered by the first port to return the piston from its forward position and mechanism for operating said valves.

11. In a torpedo mechanism starter a tubular plunger adapted to be inserted through an opening through the shell of the torpedo, a lever connected with said plunger for inserting said plunger through the opening through the torpedo shell, a stop for preventing the longitudinal motion of the torpedo firing rod and a series of links and levers connecting said stop and said first mentioned lever whereby when the tubular plunger is withdrawn from the torpedo the stop is removed from engagement with said firing rod.

12. In a torpedo mechanism starter, means to conduct fluid under pressure to the interior of a torpedo to start the gyro-spinning-machinery and the propelling machinery, and means to insert said conducting means into the torpedo and to withdraw it from the torpedo as desired.

13. In a torpedo mechanism starter, means to conduct fluid under pressure to the interior of a torpedo to start the gyro-spinning-machinery and the propelling machinery, and means to insert said conducting means into the torpedo and to withdraw it from the torpedo when desired, without starting the gyro-spinning-machinery and the propelling mechanism.

14. In a torpedo mechanism starter means to conduct fluid under pressure to the interior of the torpedo to start the gyro-spinning-machinery and the propelling machinery before any bodily movement of the torpedo takes place and means for withdrawing said fluid conducting means from the torpedo after said machinery shall have been started.

15. In a torpedo mechanism starter means to conduct fluid under pressure to the interior of the torpedo to start the gyro-spinning-machinery and the propelling machinery before any bodily movement of the torpedo takes place, and means for automatically withdrawing said fluid conducting means from the torpedo as soon as the fluid pressure within the conduit reaches a predetermined intensity.

16. In a torpedo mechanism starter, means for controlling the starting and steering mechanism within a torpedo, means for inserting the controlling means into the torpedo and means for supplying fluid under pressure to said controlling means.

17. In a torpedo mechanism starter a longitudinally movable tubular plunger, means for inserting said plunger into a torpedo and means for latching it when so inserted.

18. In a torpedo mechanism starter a longitudinally movable tubular plunger, means for inserting said plunger into a torpedo, means for latching it when so inserted and means for admitting fluid under pressure into the tubular plunger whereby the torpedo gyro-spinning-machinery and its propelling machinery are started before any bodily movement of the torpedo takes place.

19. In a torpedo mechanism starter, a longitudinally movable tubular plunger, means for inserting said plunger into a torpedo, means for latching it when so inserted, means for admitting fluid under pressure into the tubular plunger, means for withdrawing the latch and means for cutting off the flow of fluid under pressure into said tubular plunger.

20. In a torpedo mechanism starter, a longitudinally movable tubular plunger, means for inserting said plunger into a torpedo, means for latching it when so inserted, means for admitting fluid under pressure into the tubular plunger, means for automatically withdrawing the latch and means for automatically cutting off the flow of fluid under pressure into said tubular plunger as soon as the fluid pressure within the tubular plunger reaches a predetermined intensity.

21. In a torpedo mechanism starter, a longitudinally movable tubular plunger, means for inserting said tubular plunger into a torpedo, means for latching it when so inserted, means for admitting fluid under pressure into the tubular plunger, means for automatically withdrawing the latch, means for automatically cutting off the flow of fluid under pressure into said tubular plunger as soon as the fluid pressure within the tubular plunger reaches a predetermined intensity and means for returning said tubular plunger to its initial inoperative position.

22. In a torpedo mechanism starter a longitudinally movable tubular plunger, means for inserting said tubular plunger into a torpedo, means for latching it when so inserted, means for admitting fluid under pressure into the tubular plunger, means for automatically withdrawing the latch, means for automatically cutting off the flow of fluid under pressure into said tubular plunger as soon as the fluid pressure within the tubular plunger reaches a predetermined intensity means for returning said tubular plunger to its initial inoperative position and means for locking it in this position.

23. A tubular plunger for a torpedo mechanism starter, comprising a tubular rod, a properly ported piston head thereto attached, and a nozzle secured to the engaging end of said tubular rod.

24. A tubular plunger for a torpedo mechanism starter, comprising a tubular rod, a properly ported piston head thereto attached, a nozzle secured to the engaging end of said tubular rod for admitting fluid under pressure to the casing properly positioned in the interior of a torpedo, said nozzle having a slidable tubular plunger valve, therein operable by the pressure of the fluid to be admitted to the torpedo.

25. In a tubular plunger for a torpedo mechanism starter, the combination of a tubular rod, a properly ported piston head thereto attached, a nozzle secured to the engaging end of said tubular plunger and a slidable tubular plunger valve properly seated within the nozzle having one or more ports to permit the escape of fluid under pressure.

26. In a tubular plunger for a torpedo mechanism starter, the combination of a tubular rod, a properly ported piston head thereto attached, a nozzle secured to the engaging end of said tubular plunger a slidable tubular plunger valve therein operable said tubular plunger valve having one or more ports to permit the escape of fluid under pressure and means for retaining the tubular plunger valve normally housed within the nozzle.

27. In a torpedo mechanism starter, the combintaion of a longitudinally movable tubular plunger, a cylinder therefor, and a valve for admitting fluid under pressure to either end of said cylinder whereby the tubular plunger may be inserted into or withdrawn from the interior of a torpedo.

28. In a torpedo mechanism starter, the combination of a longitudinally movable tubular plunger, having a properly ported piston head thereto attached, a cylinder therefor, a valve for admitting fluid under pressure to either end of said cylinder, means for oscillating said valve to its operative position and means for returning said valve to its inoperative or neutral position.

29. In a torpedo mechanism starter, the combination of a longitudinally movable tubular plunger having a properly ported piston head thereto attached, a cylinder therefor, a valve for admitting fluid under pressure to either end of said cylinder, means for oscillating said valve to its operative position, means for automatically returning said valve to its inoperative or neutral position and means for locking said valve when thus positioned.

30. In a valve for admitting fluid under pressure to either end of a cylinder, the combination of a valve plug, a casing therefor, means for oscillating said valve plug whereby ports therein are brought into registration with passageways for conducting fluid under pressure to either end of said cylinder, and means for automatically returning said valve plug to its port sealing or neutral position.

31. In a valve for admitting fluid under pressure to either end of a cylinder, the combination of a valve plug, a casing therefor, means for oscillating said valve plug, a pinion on one end of said plug, a rack in engagement with said pinion and means for controlling the position of said rack whereby the valve plug will normally be retained in its port sealing or neutral position.

32. In a torpedo mechanism starter, the combination of a longitudinally movable tubular plunger having a properly ported piston head thereto attached, a cylinder therefor, a valve for admitting fluid under pressure to said cylinder whereby the tubular plunger is inserted into a torpedo, means for locking the tubular plunger when so inserted said means including a piston and cylinder therefor, and a second valve preferably operated by the closing of an electric circuit for admitting fluid under pressure into said tubular plunger and into said plunger locking cylinder and into said tubular plunger cylinder whereby the torpedo gyro spinning and propelling mechanisms are started and whereby the locking device is withdrawn from said tubular plunger when the fluid pressure within the plunger shall have attained a predetermined intensity and whereby the tubular plunger is driven to its initial inoperative position.

33. In a torpedo mechanism starter, the combination of a longitudinally movable tubular plunger having a properly ported piston head thereto attached, a cylinder therefor, a valve for admitting fluid under pressure to said cylinder whereby the tubular plunger is inserted into a torpedo, means for locking said tubular plunger when so inserted, a second valve plug, properly ported, a casing therefor, means for oscillating said valve plug to its port sealing or neutral position, independent oscillating means positively connected to said valve, means for automatically locking said independent oscillating means when the valve plug is in its port sealing or neutral position, means preferably operated by the closing of an electric circuit for releasing the valve plug independent oscillating means whereby said valve plug is rotated so as to bring its ports in registration with the conduits in said casing and whereby fluid under pressure is admitted to the tubular plunger to start the torpedo gyro-spinning-machinery and the propelling machinery and whereby the locking device is withdrawn from said tubular plunger when the fluid pressure within the plunger reaches a predetermined intensity and whereby fluid under pressure is admitted to the tubular plunger cylinder to drive the tubular plunger to its initial inoperative position.

34. In a torpedo mechanism starter in combination of a longitudinally movable tubular plunger, a cylinder therefor, a valve casing, conduits leading from said valve casing to said tubular plunger cylinder, a properly ported valve plug in said casing, oscillating means attached to said valve plug whereby when said valve is rocked to its operative position, fluid under pressure is admitted to said tubular plunger cylinder to drive the tubular plunger to its fully inserted operative position with its nozzle penetrating into the torpedo interior, means for locking the tubular plunger when so inserted, said means including a piston and cylinder therefor, means positively connected to said valve plug for retaining it in its port sealing or neutral position, a second valve plug properly ported, a casing therefor, a conduit leading from said casing to admit fluid under pressure to said tubular plunger when it is in its fully inserted operative position, a second conduit leading from said casing to admit fluid under pressure to said tubular plunger locking pin cylinder, a third conduit leading from said casing to admit fluid under pressure to the tubular plunger cylinder, all three conduits in said casing being properly positioned to register with the ports in said valve plug when it is in its operating position.

35. In a machine of the class described the combination of a valve plug, a casing therefor, a pinion on the end of said valve plug, a rack in engagement with the pinion, a plunger connected with the rack, a latch for locking said plunger with the valve plug in its port sealing or neutral position, mechanism for tripping said latch and means for moving said rack longitudinally whereby the valve plug is turned to its operative position.

36. In a torpedo mechanism starter, the combination of a longitudinally movable tubular plunger, means for setting a gyro-steering device, and means positively connecting the tubular plunger with the gyro-setting device.

37. In a torpedo mechanism starter the combination of a longitudinally movable tubular plunger, a gyro-setting device, means positively connecting the tubular plunger with the gyro-setting device and means for reciprocating said connected devices whereby both are caused to travel in unison.

38. In a torpedo mechanism starter the combination of a longitudinally movable tubular plunger, a gyro-setting shaft, means positively connecting the gyro setting shaft with the tubular plunger, and means for reciprocating said connected elements whereby both are simultaneously projected into or withdrawn from the torpedo tube as desired.

39. In a firing circuit closer for a torpedo mechanism starter the combination of a longitudinally movable terminal plunger, an elongated terminal element (suitably insulated) therein positioned, means connecting said terminal element with one pole of a source of electricity, a casing for said terminal plunger, a suitably insulated terminal wiping member properly positioned on said casing, means connecting said terminal wiping member with the opposite pole of a source of electricity and means for withdrawing said terminal plunger to its fully retracted "cocking" position.

40. In a firing circuit closer for a torpedo mechanism starter the combination of a longitudinally movable terminal plunger, an elongated terminal element (suitably insulated) therein positioned, means connecting said terminal element with one pole of a source of electricity, a casing for said terminal plunger, a suitably insulated terminal wiping member properly positioned on said casing, means connecting said terminal wiping member with the opposite pole of a source of electricity, means for retracting said terminal plunger, and means for locking said terminal plunger in its fully retracted position.

41. In a firing circuit closer for a torpedo mechanism starter the combination of a longitudinally movable terminal plunger, an elongated terminal element (suitably insulated) therein positioned, means connecting said terminal element with one pole of a source of electricity, a casing for said terminal plunger, a suitably insulated terminal wiping member properly positioned on said casing, means connecting said terminal wiping member with the opposite pole of a source of electricity, means for retracting said terminal plunger, means for locking said plunger in its fully retracted "cocking" position and means for releasing the locking means.

42. In a firing circuit closer for a torpedo mechanism starter the combination of a longitudinally movable terminal plunger, an elongated terminal element (suitably insulated) therein positioned, means connecting said terminal element with one pole of a source of electricity, a casing for said terminal plunger, a suitably insulated terminal wiping member properly positioned on said casing, means connecting said terminal wiping member with the opposite pole of a source of electricity, means for retracting said terminal plunger, means for locking said terminal plunger in its fully retracted position, means for releasing the locking means and means for projecting said terminal plunger into said casing thereby causing the terminal within the plunger to contact with said terminal wiping member during practically its entire travel.

43. In a firing circuit closer for a torpedo mechanism starter the combination of a longitudinally movable terminal plunger and means for automatically locking said terminal plunger in its fully retracted position.

44. In a firing circuit closer for a torpedo mechanism starter the combination of a longitudinally movable terminal plunger, a gyro setting device means for automatically locking said terminal plunger in its fully retracted position and means for automatically releasing the locking means at a predetermined point in the travel of the gyro-setting member.

45. In a firing circuit closer for a torpedo mechanism starter the combination of a longitudinally movable terminal plunger, means for starting the torpedo machinery means for automatically locking said terminal plunger in its fully retracted position and means for automatically releasing the locking means at a predetermined point in the retracting movement of the torpedo starting means.

46. In a firing circuit closer for a torpedo mechanism starter the combination of a longitudinally movable terminal plunger, means for automatically locking said terminal plunger in its fully retracted position and means for automatically releasing the locking means.

47. In a firing circuit closer for a torpedo mechanism starter the combination of a longitudinally movable terminal plunger, means for automatically locking said terminal plunger in its fully retracted position, a gyro setting shaft, means for automatically releasing the locking means at a predetermined point in the retracting movement of the gyro-setting shaft and means automatically disengaging the locking means from the releasing means substantially when the gyro-setting shaft is in its fully retracted position.

48. In a firing circuit closer for a torpedo mechanism starter the combination of a longitudinally movable terminal plunger, a locking element therefor and coacting means properly positioned and connected whereby the locking element shall be free to engage and lock the terminal plunger when the gyro-setting shaft is in either its fully inserted or fully retracted position.

49. In a firing circuit closer for a torpedo mechanism starter the combination of a longitudinally movable terminal plunger, a locking element therefor, a gyro setting shaft and releasing means properly positioned and connected whereby when the gyro-setting shaft is inserted into the torpedo tube the releasing means will automatically and positively engage the locking element.

50. In a firing circuit closer for a torpedo mechanism starter the combination of a suitably shaped and chambered longitudinally movable terminal plunger, a casing therefor, an insulated terminal wiping member properly positioned on said casing, means connecting the terminal wiping member with one pole of a source of electricity, an elongated terminal element properly positioned in the plunger terminal chamber, means connecting the terminal element with the opposite pole of a source of electricity, insulating members in said terminal chamber for properly insulating the elongated terminal element, one of said insulating members being positioned to contact with said terminal wiping member when the terminal plunger is in either its fully retracted or fully inserted position.

51. In a firing circuit closer for a torpedo mechanism starter, the combination of a suitably shaped and chambered longitudinally movable terminal plunger, a casing therefor, an insulated terminal wiping member properly positioned on said casing, means connecting the terminal wiping member with one pole of a source of electricity, an elongated terminal element properly positioned in the terminal plunger, means connecting the terminal element with the opposite pole of a source of electricity, insulating members for said terminal element, means for withdrawing the terminal plunger from its casing, means for locking the terminal plunger in its fully retracted position, means for releasing the terminal plunger and means for projecting the terminal plunger into its casing thereby causing the elongated terminal to contact with the terminal wiping member during nearly the entire travel of the plunger.

52. A firing circuit closer for a torpedo mechanism starter, comprising a suitably shaped and chambered longitudinally movable terminal plunger, a casing therefor, an elongated terminal element properly positioned in the plunger casing, means connecting the terminal element with one pole of a source of electricity, insulating members for said terminal element, means for withdrawing the terminal plunger from its casing, means for locking the terminal plunger in its fully retracted position, means for releasing the terminal plunger, and means for projecting the terminal plunger into its casing, an insulated terminal wiping member properly positioned on the plunger casing, means connecting the terminal wiping member with the opposite pole of a source of electricity, said wiping member being so positioned as not to contact with the insulated plunger terminal element when the plunger is in either its fully retracted or fully inserted position.

53. A longitudinally movable terminal plunger for a firing circuit closer, comprising a plunger rod, a piston head attached to its inserted end, said plunger rod having a terminal chamber and a second chamber adjacent the terminal chamber wherein is positioned the operating spring and abutment therefor.

54. A longitudinally movable terminal plunger for a firing circuit closer, comprising a plunger rod, a piston head thereto attached, a casing for said plunger rod, and a cylinder for said piston head, said casing and cylinder being properly positioned and connected to support and guide the piston head during its operative movement.

55. A longitudinally movable terminal plunger for a firing circuit closer, having a piston head thereto attached, a cylinder for the piston head, means for locking the retracted plunger when the piston head is in one terminal position, means for releasing the locking means and means for forcing the piston head to travel through the cylinder to its other terminal position.

56. A longitudinally movable terminal plunger for a firing circuit closer, having a piston head thereto attached, a cylinder for the piston head, means for locking the retracted plunger when the piston head is in its operative terminal position, means for freely admitting air into the cylinder during the retracting movement of the piston head, means for forcing the piston head to travel through the cylinder to its other terminal position, and means controlling the flow of air from the cylinder thereby retarding the travel of the piston head.

57. A retarder for a circuit closer, comprising a cylinder, a piston head therein, operating means connected to said piston head, means for freely admitting air to the interior of the cylinder during the retracting movement of the piston head and means regulating the flow of air from the cylinder as the piston head is returned to its inoperative position, thereby retarding the travel of the piston head.

58. In a firing circuit closer for a torpedo mechanism starter, the combination of an electrical contact carrying member movable in two opposite directions, means for positively moving said member in one direction and means for retarding said member during at least a portion of its movement by said moving means.

59. In a firing circuit closer for a torpedo mechanism starter the combination of a movable terminal member suitably supported and guided to receive a retracting movement and properly connected to co-acting means thereby to receive an operative movement in the opposite direction, means for retracting the terminal member, means positively imparting to the terminal member its operative movement in the opposite direction and means for retarding said terminal member during this movement.

60. In a firing circuit closer a longitudinally movable electric terminal member, means to return it to and normally hold it at one end of its travel, means for withdrawing it to the other end of its travel, means for locking it in this position, means releasing the locking means, and means for retarding its returning movement.

61. In a torpedo mechanism starter, means for setting the torpedo gyro steering mechanism and means positively locking the torpedo discharging means until the setting means shall have been fully withdrawn from the tube to its inoperative position.

62. In a torpedo mechanism starter, means for setting the torpedo gyro steering mechanism, a safety bolt, operating means positively connected to the safety bolt and means carried by the gyro setting means for controlling the movement of the bolt operating means.

63. In a torpedo mechanism starter, means for setting the torpedo gyro steering mechanism, means for inserting the setting means to its operative position with its wrench inserted into the gyro socket within the torpedo shell, a safety bolt, operating means positively connected to the safety bolt and means carried by the gyro-setting means for projecting the safety bolt to its locking position.

64. In a torpedo mechanism starter, means for setting the torpedo gyro steering mechanism, means for inserting the setting means to its operative position with its wrench inserted into the gyro socket within the torpedo shell, a safety bolt, operating means positively connected to the safety bolt, and means carried by the gyro setting means supporting the safety bolt in its locking position obstructing thereby the operative movement of the tube discharging means until the gyro setting means shall have been fully withdrawn from the tube to its inoperative position.

65. In combination with a torpedo, means insertible within the torpedo to start mechanism therein, means to fire the torpedo and an interlocking shutter between the starting mechanism and the firing means including a properly shaped projecting rib or cam plate connected to the starting mechanism and a vertically extending arm to engage the firing means.

66. In a torpedo mechanism starter a frame or casing, gyro setting means therein, a contact member carried by the said setting means, a tube safety interlock shutter, means pivotally connecting the shutter to the starter frame or casing, a properly shaped laterally projecting rib or cam face secured to said shutter and extending thereon so as to rest upon and engage for its entire travel said contact member carried by the gyro-setting means.

67. In a torpedo mechanism starter the combination of a longitudinally movable air conducting means for introducing fluid under pressure into the interior of a torpedo to start the gyro spinning and the propelling machinery and means for inserting said air conducting means into the torpedo to its operative position and for withdrawing it from the torpedo to its inoperative position as desired.

68. In a torpedo mechanism starter the combination of a longitudinally movable air conducting means for introducing fluid under pressure into the interior of a torpedo to start the gyro spinning and the propelling machinery, means for inserting said air conducting means into the torpedo to its operative position, means for locking the air conducting means when so inserted and means for admitting fluid under pressure into said air conducting means whereby the gyro-spinning machinery and the propelling machinery are started before any bodily movement of the torpedo takes place.

69. In a torpedo mechanism starter the combination of a longitudinally movable air conducting means for introducing fluid under pressure into the interior of a torpedo to start the gyro spinning and the propelling machinery, means for inserting said air conducting means into the torpedo to its operative position, means for locking the air conducting means when so inserted, controlling means for said air conducting means and means for admitting fluid under pressure into said air conducting means whereby the gyro spinning machinery and the propelling machinery are started before any bodily movement of the torpedo takes place.

70. In a torpedo mechanism starter the combination of a longitudinally movable air conducting means for introducing fluid under pressure into the interior of a torpedo to start the gyro spinning and the propelling machinery, means for setting the gyro steering control mechanism, means positively connecting the starting means with the gyro setting means, and means for reciprocating said connected means whereby both are simultaneously projected into or withdrawn from the torpedo as desired.

As evidence that I claim the foregoing as my invention I have signed my name hereto.

GEORGE ALFRED KNOX.